(12) United States Patent
Zhuang et al.

(10) Patent No.: US 8,387,657 B2
(45) Date of Patent: Mar. 5, 2013

(54) METHODS AND APPARATUS TO DETERMINE A POSITION OF A VALVE

(75) Inventors: Yin Zhuang, Shanghai (CN); Lu Cang, Shanghai (CN); Fan Jian Jun, Shanghai (CN)

(73) Assignee: Fisher Controls International, LLC, St. Louis, MO (US)

( * ) Notice: Subject to any disclaimer, the term of this patent is extended or adjusted under 35 U.S.C. 154(b) by 741 days.

(21) Appl. No.: 12/098,569

(22) Filed: Apr. 7, 2008

(65) Prior Publication Data

US 2008/0308157 A1   Dec. 18, 2008

Related U.S. Application Data

(60) Provisional application No. 60/944,285, filed on Jun. 15, 2007.

(51) Int. Cl.
*E03B 7/07* (2006.01)
*F16K 37/00* (2006.01)
*F17D 3/00* (2006.01)

(52) U.S. Cl. .......................... 137/557; 137/553; 137/630

(58) Field of Classification Search .................. 137/557, 137/629, 630, 487, 553, 554; 73/861.61, 73/861.62
See application file for complete search history.

(56) References Cited

U.S. PATENT DOCUMENTS

| | | | |
|---|---|---|---|
| 3,878,862 A * | 4/1975 | Blanton | 137/553 |
| 4,862,916 A | 9/1989 | Gaunt | |
| 4,961,441 A | 10/1990 | Salter | |
| 5,158,230 A | 10/1992 | Curran | |
| 5,174,323 A | 12/1992 | Haselden | |
| 5,238,016 A | 8/1993 | Eidsmore | |
| 5,269,341 A | 12/1993 | Nusz et al. | |
| 5,333,636 A | 8/1994 | Nusz et al. | |
| 5,357,996 A | 10/1994 | Ioannides et al. | |
| 5,460,196 A | 10/1995 | Yonnet | |
| 5,568,882 A | 10/1996 | Takacs | |
| 5,636,653 A | 6/1997 | Titus | |
| 5,660,198 A | 8/1997 | McClaran | |
| 5,730,323 A | 3/1998 | Osborne | |
| 5,787,925 A | 8/1998 | Ollivier | |
| 5,950,667 A | 9/1999 | Nicewonger et al. | |
| 6,021,808 A | 2/2000 | Dulac | |

(Continued)

FOREIGN PATENT DOCUMENTS

| | | |
|---|---|---|
| CH | 362579 | 6/1962 |
| GB | 1512895 | 6/1978 |

(Continued)

OTHER PUBLICATIONS

Fisher Controls International, LLC, "Type C407-10 Internal Valves Instruction Manual," Product Manual of Fisher Controls International, LLC, Jan. 2002 (8 pages).

(Continued)

*Primary Examiner* — John K Fristoe, Jr.
*Assistant Examiner* — Seth Faulb
(74) *Attorney, Agent, or Firm* — Hanley, Flight & Zimmerman, LLC

(57) ABSTRACT

Methods and apparatus to indicate a position of a valve are described. An example apparatus includes a first pressure sensor to detect an inlet pressure of a valve, a second pressure sensor to detect an outlet pressure of the valve, and a controller operatively coupled to the first pressure sensor and the second pressure sensor to determine a position of the valve corresponding to one of a plurality of predetermined operational states of the valve.

20 Claims, 3 Drawing Sheets

U.S. PATENT DOCUMENTS

| | | | |
|---|---|---|---|
| 6,112,137 | A | 8/2000 | McCarty et al. |
| 6,205,409 | B1 | 3/2001 | Zvonar |
| 6,349,735 | B2 | 2/2002 | Gul |
| 6,422,256 | B1 | 7/2002 | Balazy et al. |
| 6,460,730 | B1 | 10/2002 | Liedtke |
| 6,463,949 | B2 | 10/2002 | Ferguson et al. |
| 6,536,456 | B2 | 3/2003 | Dickerson, Jr. et al. |
| 6,539,267 | B1 | 3/2003 | Eryurek et al. |
| 6,568,416 | B2 | 5/2003 | Tucker et al. |
| 6,654,697 | B1 | 11/2003 | Eryurek et al. |
| 6,695,017 | B1 | 2/2004 | Liedtke |
| 6,701,274 | B1 | 3/2004 | Eryurek et al. |
| 6,823,887 | B2 | 11/2004 | Dulac |
| 6,877,170 | B1 | 4/2005 | Quintana et al. |
| 6,938,635 | B2 * | 9/2005 | Bolland ............................ 137/2 |
| 6,941,965 | B2 | 9/2005 | Lull et al. |
| 7,025,088 | B2 * | 4/2006 | Saunders ...................... 137/552 |
| 2003/0071736 | A1 * | 4/2003 | Brazier et al. ................. 340/614 |
| 2005/0189018 | A1 * | 9/2005 | Brodeur et al. ............ 137/487.5 |
| 2007/0028899 | A1 * | 2/2007 | Allen ............................ 123/494 |
| 2007/0198131 | A1 | 8/2007 | Tokuhisa et al. |

FOREIGN PATENT DOCUMENTS

| | | |
|---|---|---|
| JP | 5210178 | 8/1977 |
| JP | 8502134 | 3/1996 |

OTHER PUBLICATIONS

State Intellectual Property Office of P.R. China, "First Office Action," English translation, issued in connection with Chinese application No. 200880020330.X, issued Aug. 6, 2010, 9 pages.

International Search Report and Written Opinion for corresponding international patent application No. PCT/US2008/065391, Mailed on Sep. 12, 2008, 13 pages.

State Intellectual Property Office of P.R. China, "Third Office Action," issued in connection with Chinese application serial No. 200880020330.X, issued Oct. 9, 2011, 5 pages.

Austrian Patent Office, "Examination Report," issued in connection with Austrian application serial No. GCC/P/2008/11052, mailed Sep. 16, 2011, 4 pages.

Japanese Patent Office, "Office Action," English Translation, issued in connection with Japanese application serial No. 2010-512254, mailed Sep. 18, 2012, 3 pages.

* cited by examiner

METHODS AND APPARATUS TO DETERMINE A POSITION OF A VALVE

This application claims the benefit of U.S. Provisional Application Ser. No. 60/944,285, filed on Jun. 15, 2007, which is incorporated herein by reference in its entirety.

FIELD OF THE DISCLOSURE

The present disclosure relates generally to valves and, more particularly, to methods and apparatus to determine a position of a valve.

BACKGROUND

Valves are commonly used in process fluid handling systems and fluid delivery systems to manipulate the flow of a fluid. In general, a valve may regulate flow by selectively allowing or inhibiting fluid to reach a destination. The fluid pressures associated with the systems often affect the operation of the valves. For example, valves may be opened or closed to manipulate the pressure at different points or stages of a process. In other examples, the operation of a valve may depend on pressure values at defined points in the system.

One example is an internal valve that opens or closes based on a pressure and/or fluid flow rate of the system in which the internal valve is installed. Valves may be installed internally to reduce the possibility of mechanical damage resulting from external sources (e.g., accidental impact, fire, wear, etc.). However, internal valves are less accessible after installation. As a result, in some cases, the valve position or status (e.g., whether the valve is open, closed, in a bleed mode, etc.) is not always clear to an operator.

Where the position of a valve is not available or clear, an operator may be forced to employ manual methods (e.g., operator intervention or involvement may be required) to operate the control system in which the valve is installed. As a result, operator error may be introduced into the control system. For example, the internal valves noted above may employ a flow control mechanism to shut the valve in response to a sudden excess flow condition due to, for example, a broken, severed, or otherwise compromised flow path. Such flow control mechanisms are commonly referred to as excess flow valves, which are often used in applications requiring an automatic, safe cutoff of fluid flow in response to potential leaks, spills, etc. of potentially dangerous (e.g., combustible, toxic) fluids.

When operating a system employing an internal valve having an integral excess flow valve, it is typically necessary to equalize the pressure between the valve inlet and outlet before fluid is pumped through the valve. Without knowledge of the position or operational state of the internal valve (i.e., whether the pressure is equalized) the operator may, for example, prematurely begin to pump fluid based on an estimation of whether the valve is prepared to convey fluid. Such an approach may be inefficient if, for example, several attempted equalizations are performed due to operator error.

SUMMARY

An example apparatus for use with a valve includes a first pressure sensor to detect an inlet pressure of the valve and a second pressure sensor to detect an outlet pressure of the valve. The example valve apparatus also includes a controller operatively coupled to the first pressure sensor and the second pressure sensor to determine a position of the valve corresponding to one of a plurality of predetermined operational states of the valve.

An example method for use with a valve apparatus includes obtaining an inlet pressure of the valve and obtaining an outlet pressure of the valve. The method also includes comparing the inlet pressure to the outlet pressure to determine a position of the valve corresponding to one of a plurality of predetermined operational states of the valve.

An example system includes a tank having an internal valve to control a flow of fluid, a first pressure sensor to detect an inlet pressure of the internal valve, and a second pressure sensor to detect an outlet pressure of the internal valve. The example control system also includes a controller operatively coupled to the first pressure sensor and the second pressure sensor, wherein the controller is to calculate a differential pressure between the inlet pressure and the outlet pressure, and wherein the differential pressure indicates a position of the internal valve corresponding to one of a plurality of predetermined operational states of the internal valve. The example control system also includes a display operatively coupled to the controller to communicate the status of the internal valve to a user.

DETAILED DESCRIPTION

Many known fluid control or delivery systems include valves that are not fully accessible after installation. For example, a valve may be installed within a tank to control the flow of a pressurized liquid (e.g., liquid propane). Such internal valves may be designed to operate automatically, free from external control and dependent solely or primarily on system conditions (e.g., pressure values). While these internal valves are safeguarded from certain dangers (e.g., mechanical damage from external impact), the limited access to such valves often makes it difficult or impossible to determine the position or status (i.e., the operational state) of the valve.

In contrast, the example apparatus and methods described herein provide an operator with status information regarding components of a fluid control process or delivery system that may otherwise remain unknown to system operators and/or any other persons or equipment associated with the system. More specifically, the examples described below utilize sensors (e.g., pressure sensors or gauges) to calculate conditions (e.g., inlet and/or outlet pressures) associated with an internal valve that may indicate or be used to determine a distinct position or operational state of the valve. For example, the pressure differential measured by the sensors indicates a position of the valve corresponding to one of a plurality of predetermined or distinct operational states of the valve such as, for example, an open state, a closed state, an intermediate state, etc. The status information may then be processed and/or communicated to an operator, thereby providing a greater degree of control over the system.

Figure 1:
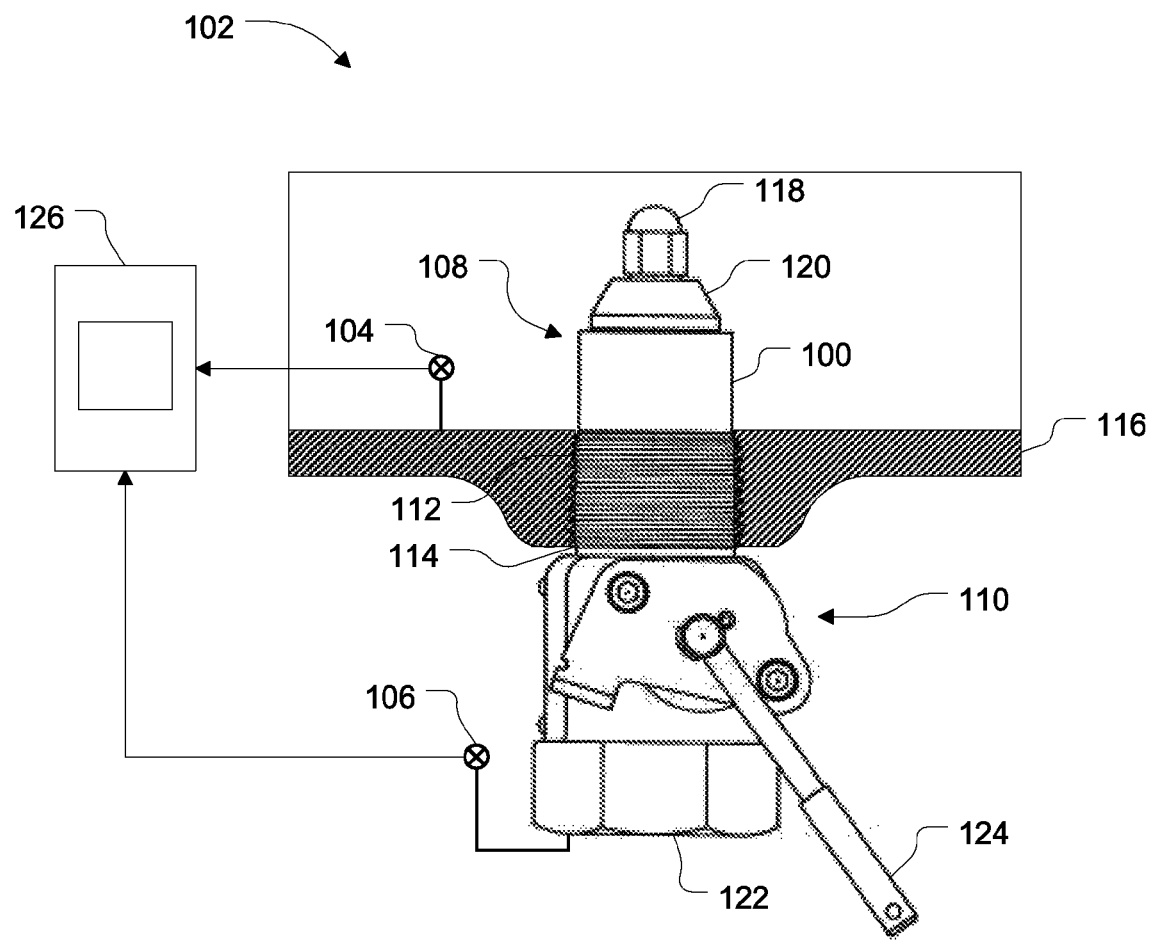
FIG. 1 depicts an example valve installed in a system including example pressure sensors to determine a position of the valve.

FIG. 1 depicts an example valve 100 installed in a system 102 including example pressure sensors 104 and 106 to determine a position of the valve 100 corresponding to one of a plurality of predetermined and/or distinct operational states of the valve 100 such as, for example, an open state, a closed state, an intermediate state, etc. The example valve 100 may be implemented in a gas or liquid production system, a process fluid transportation or distribution system, etc. In this example, the valve 100 includes an upper portion 108 and a lower portion 110 which are separated by a threaded body 112. The threaded body 112 may be engaged with a corresponding threaded aperture 114 of a tank 116 (or other suitable storage vessel), thereby disposing the upper portion 108 of the valve 100 inside the tank 116. The tank 116 may contain a pressurized gas or liquid (i.e., a fluid) to be delivered to a destination via, for example, the valve 100. In other words, the upper portion 108 of the valve 100 may be surrounded by fluid. To facilitate the flow of the fluid from the tank 116, the valve 100 includes an equalization member 118 and a main poppet 120, which open and close to allow the fluid to flow through the valve 100 at varying flow rates. Opening and closing of the equalization member 118 and the main poppet 120 may be affected by pressure differentials across the valve 100, as described further below.

The equalization member 118, the main poppet 120, and additional supporting valve elements provide an excess flow functionality that maintains system safety. More specifically, the excess flow function protects the system by automatically restricting fluid flow when a flow rate becomes too high, as described further below. An example of a valve that includes excess flow functionality is the FISHER® C407 Series Internal Valve, with which the methods and apparatus described herein may be employed.

The lower portion 110 of the valve 100 may be disposed outside of the tank 116 and may include an outlet member 122 to receive a hose, pipe, or other suitable fluid transport component. In other words, fluid flows from the tank 116 to a transport component (e.g., a hose) via the valve 100 to a destination (e.g., another storage tank and/or additional process control elements). The valve 100 also includes a lever 124 which may be operated manually to open and close the valve 100.

In FIG. 1, the pressure sensors 104 and 106 (e.g., gauges to transmit pressure information) are operatively coupled to a controller 126, which may be located, for example, on an outside surface of the tank 116. The first pressure sensor 104 detects the inlet pressure of the valve, which may be substantially equal to the pressure within the tank 116. The second pressure sensor 106 detects an outlet pressure of the valve 100. The inlet pressure and the outlet pressure may be communicated to the controller 126.

The pressure readings from the pressure sensors 104 and 106 may be used by the controller 126 to determine a position of the valve 100. For example, as noted above, the operation of the flow control elements of the valve 100 (i.e., the equalization member 118 and the main poppet 120) may be based on a pressure differential between the inlet pressure and the outlet pressure of the valve 100. More specifically, when the inlet pressure is substantially greater than the outlet pressure, the main poppet 120 remains in a closed position. On the other hand, when the inlet pressure is approximately equal to the outlet pressure, the main poppet 120 opens to allow fluid to flow through the valve 100 at a relatively high rate. Further, the equalization member 118 may close or open to varying degrees to establish a balance of pressure between the inlet and outlet of the valve 100. For example, the equalization member 118 may place the valve 100 in a bleed state that allows a certain amount of flow to equalize pressure across the valve 100. Further, the equalization member 118 may shut (i.e., seal with the main poppet 120) where the pressure differential dictates that the flow of fluid must terminate. As the operations described herein are for illustrative purposes, alternative operations are possible for the equalization member 118, the main poppet 120, or additional valve elements, which may be altered or augmented to suit the needs of various processes and/or applications.

Regardless of the operation of the control elements (e.g., the equalization member 118 and the main poppet 120), the controller 126 is configured to determine a position of the valve 100 that corresponds to predetermined or distinct operational state based on the readings obtained from the pressure sensors 104 and 106. By comparing the inlet pressure and the outlet pressure of the valve 100, the controller 126 may determine whether the valve 100 is open, closed, or in an intermediate state (e.g., in a bleed state). For example, as mentioned above, an inlet pressure equal to an outlet pressure of the valve 100 may indicate that the valve 100 is open and ready to pump fluid. After the controller 126 has determined the position of the valve 100, the position may be communicated (e.g., displayed) to an operator of the system 102. The controller 126 may include a display (as described in connection with FIG. 3 below) to communicate the position of the valve 100 to an operator. Additionally or alternatively, the system 102 may include a separate display operatively coupled (e.g., via wiring or a wireless connection) to the controller 126. An operator may utilize the position information to operate, troubleshoot, test, or otherwise manipulate the system 102.

Figure 2:
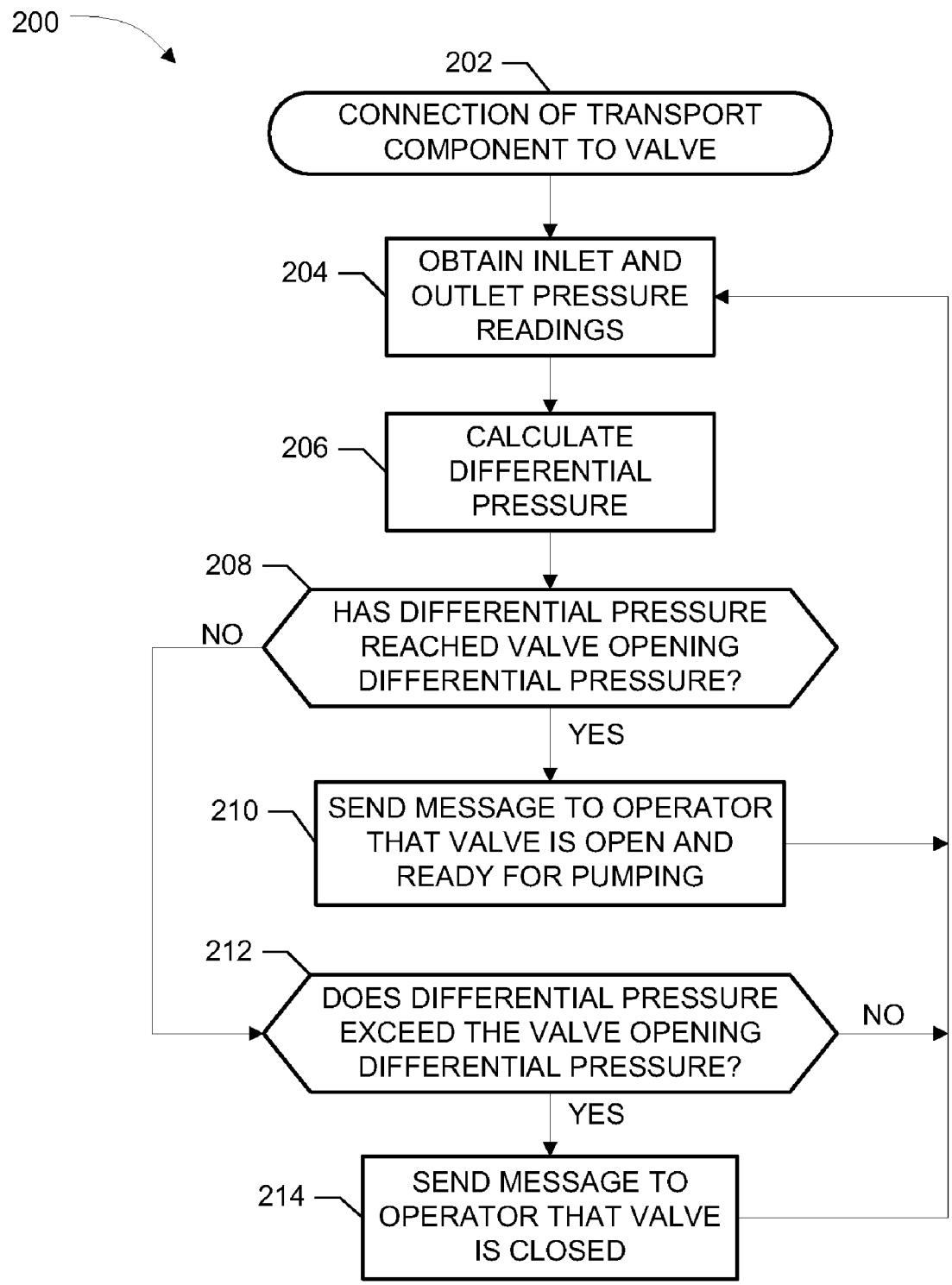
FIG. 2 is a flowchart of an example process that may be performed by the example system of FIG. 1 to determine a position of the valve.

FIG. 2 is a flowchart of an example process 200 that may be performed by the example system to determine a position of the valve corresponding to a predetermined operational state of the valve 100 of FIG. 1. The example process 200 may begin with the installation of a valve in a control system and the connection of a transport component (e.g., a hose) to the valve (block 202). The example process 200 may utilize pressure sensors (e.g., the pressure sensors 104 and 106 described above in connection with FIG. 1) to obtain an inlet and outlet pressure of the valve (block 204). Using the pressure readings, a controller (e.g., the controller 126) may calculate a pressure differential between the inlet and outlet of the valve (block 206). While a differential calculation is described herein, the controller may perform alternative operations or calculations using the pressure readings to determine a position or operational state of the valve (e.g., the valve 100). For example, the controller may also include a temperature reading or tank configuration as factors to consider during any calculations. Additionally, the controller may communicate the values it uses during its calculations to an operator via a display or audio system.

The controller may make decisions regarding the position of the valve based on its calculations. In the example process 200 of FIG. 2, the controller determines if the differential pressure between the inlet and outlet pressures is substantially equal to a predetermined valve opening differential pressure (block 208). In other words, the process 200 may include a predetermined differential pressure value that corresponds to an open state of the valve and may compare it to the variable pressure differential determined from the pressure sensors. Where the differential pressure between the inlet and outlet pressures is substantially equal to the valve opening differential pressure value, the process 200 may send (e.g., via a display) a message to an operator that the valve is open and ready to pump fluid (block 210). Otherwise, the process 200 may determine if the differential pressure between the inlet and outlet pressures exceeds the valve opening differential pressure and, if so, by what amount (block 212). Where the process 200 determines that the pressure differential between the inlet and outlet pressures exceeds the valve opening pressure differential by a sufficient amount, the process 200 may send a message to an operator that the valve is closed (i.e., that the pressure must be equalized) (block 214). Further, the process 200 may be repeated while the control system is active to continuously take pressure readings from the pressure sensors.

Figure 3:
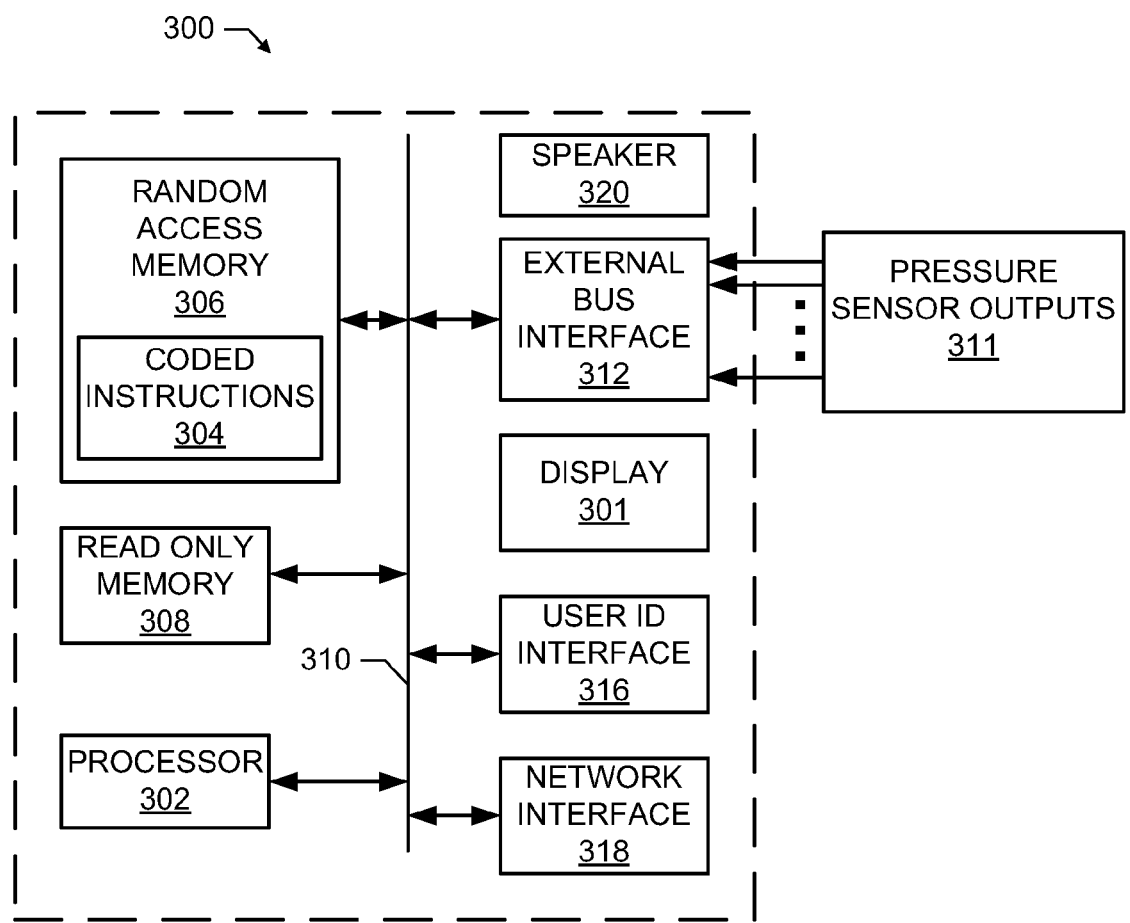
FIG. 3 is an example implementation of the example controller of FIG. 1.

FIG. 3 is a schematic diagram of an example manner of implementing an example controller 300. To process and analyze the information generated by the components (e.g., the pressure sensors 104 and 106 described in connection with FIG. 1) of a control system, the example controller 300 of FIG. 3 includes a general purpose programmable processor 302. The example processor 302 executes coded instructions 304 present in a main memory (e.g., within a random access memory (RAM) 306 as illustrated and/or within a read only memory (ROM) 308). The example processor 302 may be any type of processing unit, such as a microprocessor from the AMD®, Sun® and/or Intel® families of microprocessors. The example processor 302 may execute, among other things, machine accessible instructions to perform the example process of FIG. 3 and/or the other processes described herein.

The example processor 302 is in communication with the example main memory (including the ROM 308 and the RAM 306) via a bus 310. The example RAM 306 may be implemented by dynamic random access memory (DRAM), Synchronous DRAM (SDRAM), and/or any other type of RAM device, and the example ROM 308 may be implemented by flash memory and/or any other desired type of memory device. Access to the example memories 308 and 306 may be controlled by a memory controller (not shown) in a conventional manner.

To receive component output signals (e.g., pressure readings), the example controller 300 includes any variety of conventional interface circuitry such as, for example, an external bus interface 312. For example, the external bus interface 312 may provide one input signal path (e.g., a semiconductor package pin) for each component output. Additionally or alternatively, the external bus interface 312 may implement any variety of time multiplexed interface to receive output signals from the components via fewer input signals.

To display information for viewing by an operator, the example controller 300 may include any variety of displays 301 (e.g., a liquid crystal display screen). To allow the example controller 300 to interact with a remote server, the example controller 300 may include any variety of network interfaces 318 such as, for example, a wireless LAN interface in accordance with, for instance, the Institute of Electronics and Electrical Engineers (IEEE) 802.11b, 802.11g, 802.14.4 (a.k.a. ZigBee) etc. standards. To allow the example controller 300 to generate sounds, the example controller 300 includes any variety of speaker 320. Although an example controller 300 has been illustrated in FIG. 3, processor and display units may be implemented using any of a variety of other and/or additional devices, components, circuits, modules, etc. Further, the devices, components, circuits, modules, elements, etc. illustrated in FIG. 3 may be combined, rearranged, eliminated and/or implemented in any of a variety of ways.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An internal valve system comprising:
a first pressure sensor to detect an inlet pressure of a valve;
a second pressure sensor to detect an outlet pressure of the valve;
a controller operatively coupled to the first pressure sensor and the second pressure sensor to determine a position of the valve corresponding to one of a plurality of predetermined operational states of the valve including at least an open state, a closed state and a bleed state based on a comparison of the inlet pressure and the outlet pressure received by the respective first and second pressure sensors, the controller is to determine that the valve is in the closed state when a pressure differential between the inlet pressure and outlet pressure exceeds a valve opening differential pressure value, determine that the valve is in the bleed state when the differential pressure between the inlet pressure and the outlet is not equalized, and determine that the valve is in the open state when the pressure differential between the inlet and the outlet pressures reaches a valve opening differential pressure value; and
an indicator to provide an indication that the valve is prepared to receive a detachable fluid pipe when the valve is in the closed state, the indicator to provide an indication that the valve is in the bleed state to prevent pumping of fluid through the valve prior to an equalization of pressure across the valve, and the indicator to provide an indication that the valve is prepared to pump fluid through the fluid pipe when the valve is in the open state.

2. The internal valve system as defined in claim 1, further comprising a display operatively coupled to the controller.

3. The internal valve system as defined in claim 1, wherein the controller is to communicate a message associated with the position of the valve to a user.

4. The internal valve system as defined in claim 1, wherein the valve is to receive liquefied petroleum gas.

5. The internal valve system as defined in claim 1, wherein the valve comprises an internal excess flow valve.

6. The internal valve system of claim 1, wherein the pressure differential between the inlet pressure and the outlet pressure reaches the valve opening differential pressure value when the inlet pressure is substantially equal to the outlet pressure.

7. The internal valve system as defined in claim 1, wherein the controller calculates a differential pressure between the inlet pressure of the valve and the outlet pressure of the valve to determine the position of the valve.

8. The internal valve system as defined in claim 7, wherein the controller is to compare the differential pressure to a predetermined valve pressure value.

9. The internal valve system as defined in claim 1, wherein the valve comprises an internal valve configured to be installed in a tank.

10. The internal valve system as defined in claim 9, wherein the inlet pressure is substantially equal to a pressure in the tank.

11. The internal valve system of claim 1, further comprising a valve body defining a fluid flow passageway between an inlet and an outlet.

12. The internal valve system of claim 11, further comprising a main poppet disposed in the fluid flow passageway and movable relative to a first valve seat between an open position corresponding to the open state and a closed position corresponding to the closed state to control fluid flow between the inlet and the outlet.

13. The internal valve system of claim 12, further comprising an equalization member disposed in the fluid flow passageway and movable relative to a second valve seat to a bleed position corresponding to the bleed state to equalize the pressure between the inlet and the outlet.

14. The internal valve system of claim 13, wherein the internal valve includes a lever to manually operate the valve between the open position, the bleed position and the closed position.

15. A method for determining a position of an internal valve, the method comprising:
    obtaining an inlet pressure of the internal valve;
    obtaining an outlet pressure of the internal valve;
    comparing the inlet pressure to the outlet pressure to determine a position of the internal valve corresponding to one of a plurality of predetermined operational states of the internal valve that include an open state, a closed state and a bleed state;
    determining that the internal valve is in a closed state when the pressure differential between the inlet pressure and outlet pressure exceeds a valve opening differential pressure value;
    providing an indication that the internal valve is ready to receive a removable transport component when the internal valve is in the closed state;
    determining that the internal valve is in the bleed state when a poppet of the valve is in a bleed position;
    providing an indication that the internal valve is in the bleed state to prevent pumping of fluid through the internal valve;
    determining that the internal valve is in the open position when the pressure differential between the inlet pressure and the outlet pressure reaches a valve opening differential pressure value; and
    providing an indication that the internal valve is ready to pump fluid through the removable transport component when the internal valve is in the open state.

16. A method as defined in claim 15, wherein comparing the inlet pressure to the outlet pressure comprises calculating a differential pressure between the inlet pressure and the outlet pressure of the internal valve.

17. A method as defined in claim 15, further comprising communicating a message to a user associated with the plurality of predetermined operational states of the valve.

18. A method as defined in claim 15, further comprising manually coupling the removable transport component to an outlet of the internal valve when the internal valve is in the closed position.

19. A system comprising:
    a tank having an internal valve to control a flow of fluid, the internal valve having an output to receive a removable tubing; a first pressure sensor to detect an inlet pressure of the internal valve;
    a second pressure sensor to detect an outlet pressure of the internal valve;
    a controller operatively coupled to the first pressure sensor and the second pressure sensor, the controller is to calculate a differential pressure between the inlet pressure and the outlet pressure to determine a position of the internal valve corresponding to one of a plurality of predetermined operational states of the internal valve including an open state, a closed state and a bleed state; and
    a display operatively coupled to the controller to communicate the position of the internal valve to a user, wherein the closed state of the valve indicates that the valve is prepared to receive the removable tubing from the user, the bleed state of the valve indicates that a fluid pressure across the valve between the inlet and the outlet is in the process of equalizing and the valve is not ready to be positioned to an open position, and the open state indicates that the valve is ready to pump fluid through the removable tubing.

20. A system as defined in claim 19, wherein the inlet pressure is substantially equal to a pressure of the tank.

* * * * *